(12) United States Patent
Jones

(10) Patent No.: US 7,523,994 B2
(45) Date of Patent: Apr. 28, 2009

(54) HOIST

(76) Inventor: Eldon D. Jones, 409 E. Watonwan St., Lake Crystal, MN (US) 56055

( * ) Notice: Subject to any disclaimer, the term of this patent is extended or adjusted under 35 U.S.C. 154(b) by 0 days.

(21) Appl. No.: 11/812,677

(22) Filed: Jun. 20, 2007

(65) Prior Publication Data

US 2008/0315664 A1 Dec. 25, 2008

(51) Int. Cl.
*B60P 1/04* (2006.01)
(52) U.S. Cl. .................................... 298/22 J; 298/19 B
(58) Field of Classification Search ............... 298/22 R, 298/22 J, 22 P, 22 D, 19 B, 17 S; 254/3 C, 254/93 VA
See application file for complete search history.

(56) References Cited

U.S. PATENT DOCUMENTS

| | | | |
|---|---|---|---|
| 1,409,916 A | 9/1922 | Barkman et al. | |
| 1,534,439 A | 4/1925 | Burkhardt et al. | |
| 1,993,203 A | 3/1935 | Barrett | |
| 2,144,599 A | 1/1939 | Anthony | |
| 2,223,275 A | 11/1940 | Valenzuela | |
| 2,233,111 A | 2/1941 | Roberts | |
| 2,358,224 A | 9/1944 | Golay | |
| 2,488,790 A | 11/1949 | Wood | |
| 2,509,911 A | 5/1950 | Dore | |
| 2,603,518 A | 7/1952 | Golay | |
| 2,611,642 A | 9/1952 | Gwinn | |
| 2,836,460 A | 5/1958 | Lundell | |
| 2,856,232 A | 10/1958 | Mentes | |
| 2,953,408 A | 9/1960 | Koenig | |
| 3,010,727 A | 11/1961 | Swenson et al. | |
| 3,049,378 A | 8/1962 | Nelson | |
| 3,078,075 A | 2/1963 | Richter | |
| 3,211,428 A | 10/1965 | Spracklin | |
| RE26,455 E | 9/1968 | Jones | |
| 3,485,400 A | 12/1969 | Pewthers | |
| 3,594,042 A | 7/1971 | Gauch | |
| 3,620,458 A | 11/1971 | Kitchener | |
| 3,791,695 A * | 2/1974 | Senuik | ......... 28/22 J |
| 3,813,124 A | 5/1974 | Roland | |
| 3,897,882 A | 8/1975 | Budoff | |
| 3,964,626 A | 6/1976 | Arregui | |
| 4,010,826 A | 3/1977 | Jones | |
| 4,029,358 A | 6/1977 | Bergdolt | |
| 4,052,105 A | 10/1977 | Moe | |
| 4,109,810 A | 8/1978 | Jones | |
| 4,176,881 A | 12/1979 | Cole | |
| 4,261,520 A | 4/1981 | Hetrick | |
| 4,302,050 A | 11/1981 | Jones | |
| 4,741,576 A | 5/1988 | Jones | |
| 4,762,370 A | 8/1988 | Corompt et al. | |
| 4,938,454 A | 7/1990 | Jones | |

(Continued)

FOREIGN PATENT DOCUMENTS

CA 722518 11/1965

(Continued)

*Primary Examiner*—Stephen Gordon
(74) *Attorney, Agent, or Firm*—Pequignot + Myers LLC; Matthew A. Pequignot

(57) ABSTRACT

A hoist, for example, capable of use for raising and lowering a truck bed to and from a truck frame. In certain embodiments, a scissor-type hoist having a hydraulic cylinder pivot located to improve hoist lift efficiency (e.g., thereby exhibiting improved hoist lift capabilities).

15 Claims, 6 Drawing Sheets

U.S. PATENT DOCUMENTS

| | | |
|---|---|---|
| 5,040,849 A | 8/1991 | Thomas et al. |
| 5,048,896 A | 9/1991 | Channell |
| 5,195,385 A | 3/1993 | Johnson |
| 6,186,596 B1 | 2/2001 | Jones |
| 6,543,856 B2 | 4/2003 | Jones |
| 6,561,589 B2 | 5/2003 | Jones |

FOREIGN PATENT DOCUMENTS

| | | |
|---|---|---|
| FR | 1414976 | 9/1965 |
| GB | 2049566 | 12/1980 |

* cited by examiner

HOIST

FIELD OF THE INVENTION

This invention relates to improved hoists useful, for example, for lifting and lowering truck dump bodies. In certain example embodiments, this invention relates to improved scissor-type hoists, which exhibit improved efficiency and performance.

BACKGROUND OF THE INVENTION

Extendible and retractable hoists employed between the frame of a vehicle and its dump body for raising and lowering the dump bed about a pivoting hinge are well known in the art and come in many different types and designs (whether they be rear or side dump vehicles). The term "truck" is used herein to describe all types of vehicles, which employ such hoists, including light, medium and heavy duty dump trucks and trailers.

In a typical hydraulic truck hoist, one or more hydraulic cylinders in a hoist frame lie lengthwise in relation to the frame rails of the vehicle and underneath the truck bed. As the hoist's cylinder extends, one end of the hoist frame pushes against the underside of the dump bed to which one end of the hoist is pivotally attached while the other end of the hoist frame pushes against the frame of the truck to which the other end of the hoist is pivotally attached. This causes the bed to rotate about its rear hinge pivot whereby the dump bed is raised. Retraction of the cylinder causes the bed to be lowered.

Generally speaking, truck hoist designs known prior to the subject invention have one or more inefficiencies and/or drawbacks (or problems) associated with their use. For example, some hoist designs are configured to require long, telescopic hydraulic cylinder strokes to achieve sufficient dump angles. However, as a telescopic hydraulic cylinder extends e.g., in a long "stroke" towards its full displacement, the amount of force that it is capable of providing decreases significantly. The required length of the cylinder also impacts the cycle time required to operate the hoist. Although scissor-type hoists reduce this inefficiency (at least in part), scissor-type hoists exhibit other inefficiencies and/or problems.

For example, known scissor hoists are configured such that the hoist cylinder is nearly parallel to the dump bed when the dump bed is in the non-raised or lowered position and thus has very little initial leverage at the beginning of the lifting process. Specifically, in such designs, during the initial lift phase, much of the force of the cylinder is inefficiently directed because of the low angle of cylinder thrust relative to the truck frame and dump bed (which directs cylinder forces along the length of the truck and dump bed frame rather than in the more efficient raising direction which changes as the dump body is raised). Therefore, much of the hydraulic cylinder's lift force is wasted at the beginning of lift operation. As a result, such prior art hoists often require larger and more expensive (or multiple) cylinders otherwise unnecessary in later lifting phases (i.e., they are only required to accommodate the initial, inefficient lifting phase).

In view of the above, it is apparent that there exists a need in the art for a hoist which addresses, overcomes, mitigates, or solves one or more of the above problems and/or drawbacks and/or inefficiencies in the art. It is a purpose of this invention to fulfill this and/or other needs in the art which will become more apparent to the skilled artisan once given the following disclosure.

SUMMARY OF THE INVENTION

Generally speaking, this invention addresses the above-described needs in the art by providing a hoist which, by way of its unique configuration, exhibits improved lift efficiency and/or performance.

In certain example (non-limiting) embodiments, therein is provided: a hoist for raising or lowering a truck bed to and from a truck frame which is capable of being located between the bed and the frame, the hoist comprising:

a first lever arm having a first end connected to a truck chassis via a first pivot and having a second end connected to a first end of a second lever arm via a second pivot, the second lever arm having a second end pivotally connected to a dump bed chassis via a third pivot;

an extendible and retractable cylinder connected at a first end via a fourth pivot and connected at a second end to the second lever arm via a fifth pivot, the fifth pivot located on the second lever arm between the second and the third pivots;

wherein in an initial, non-lift position, the first lever arm and the second lever arm are in or near generally parallel orientations with respect to one another and the fourth pivot is located generally below the first pivot a selected offset distance sufficient to improve the cylinder's lift angle relative to a lift direction of the dump chassis;

wherein in a lifting phase, the cylinder extends and exerts a lifting force on the second lever arm via the fifth pivot causing the second lever arm to exert a lifting force on the dump bed chassis via the third pivot; and wherein the first and the second lever arms pivot out of the generally parallel orientations towards a dump bed lifted position.

In such embodiments, the phrases "in or near generally parallel" or "generally parallel" do not refer to a narrow condition where the first and second lever arm structures or their associated pivots are precisely parallel to one another but, instead, refer more generally to a condition when the lever arms are folded upon one another in conventional scissor hoist fashion. Thus, significant angular deviations from a precisely parallel orientation are certainly contemplated within the meaning of these phrases or terms.

In certain additionally (but still non-limiting) embodiments, the configuration of the hoist orients the lifting cylinder at a more efficient lift angle relative to a dump bed being lifted thereby improving the efficiency and/or performance (e.g., the lifting power) of the hoist. In certain other non-limiting embodiments, performance and/or efficiency is improved by 10% or more, and in certain further preferred embodiments, 20% or more improvement is achieved. In still additional non-limiting but preferred embodiments, the stroke length required of the lift cylinder is reduced by 20% or more without reducing the lift capacity of the hoist.

Certain examples of the invention are now below described with respect to certain non-limiting embodiments thereof as illustrated in the following drawings wherein:

DETAILED DESCRIPTION OF CERTAIN EMBODIMENTS

For a more complete understanding of the present invention and advantages thereof, reference is now made to the following description of various illustrative and non-limiting embodiments thereof, taken in conjunction with the accompanying drawings in which like reference numbers indicate like features.

Figure 1A:
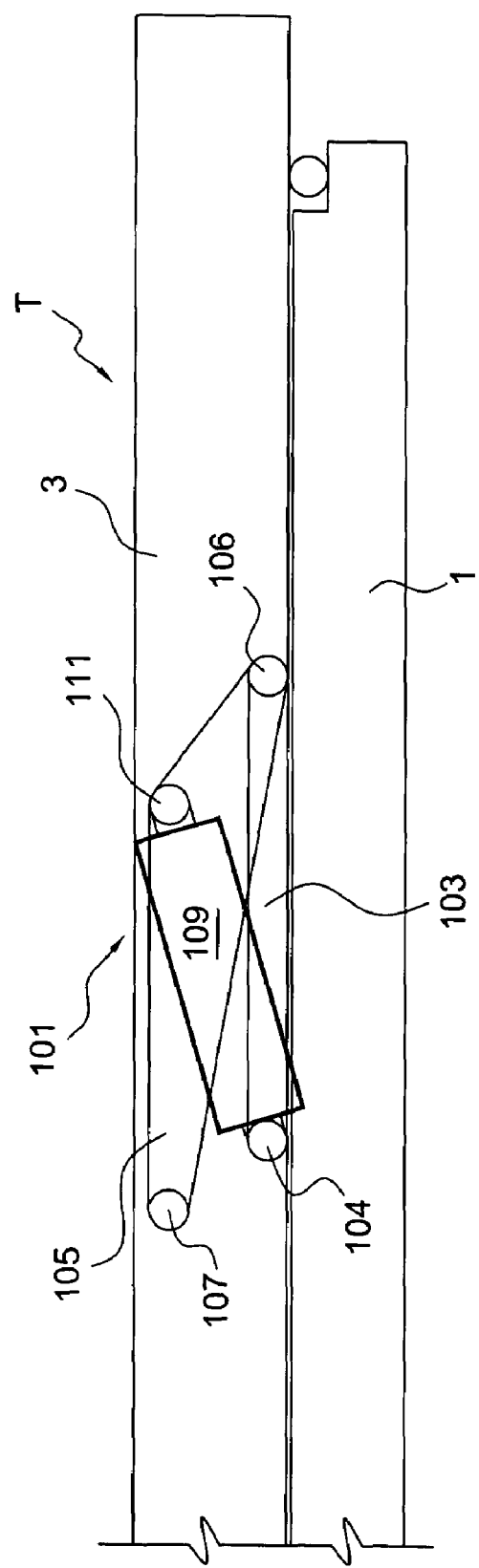
FIGS. 1A and 1B are profile, perspective views of a prior art scissor-type hoist installed between a truck frame and a dump bed.
Figure 1B:
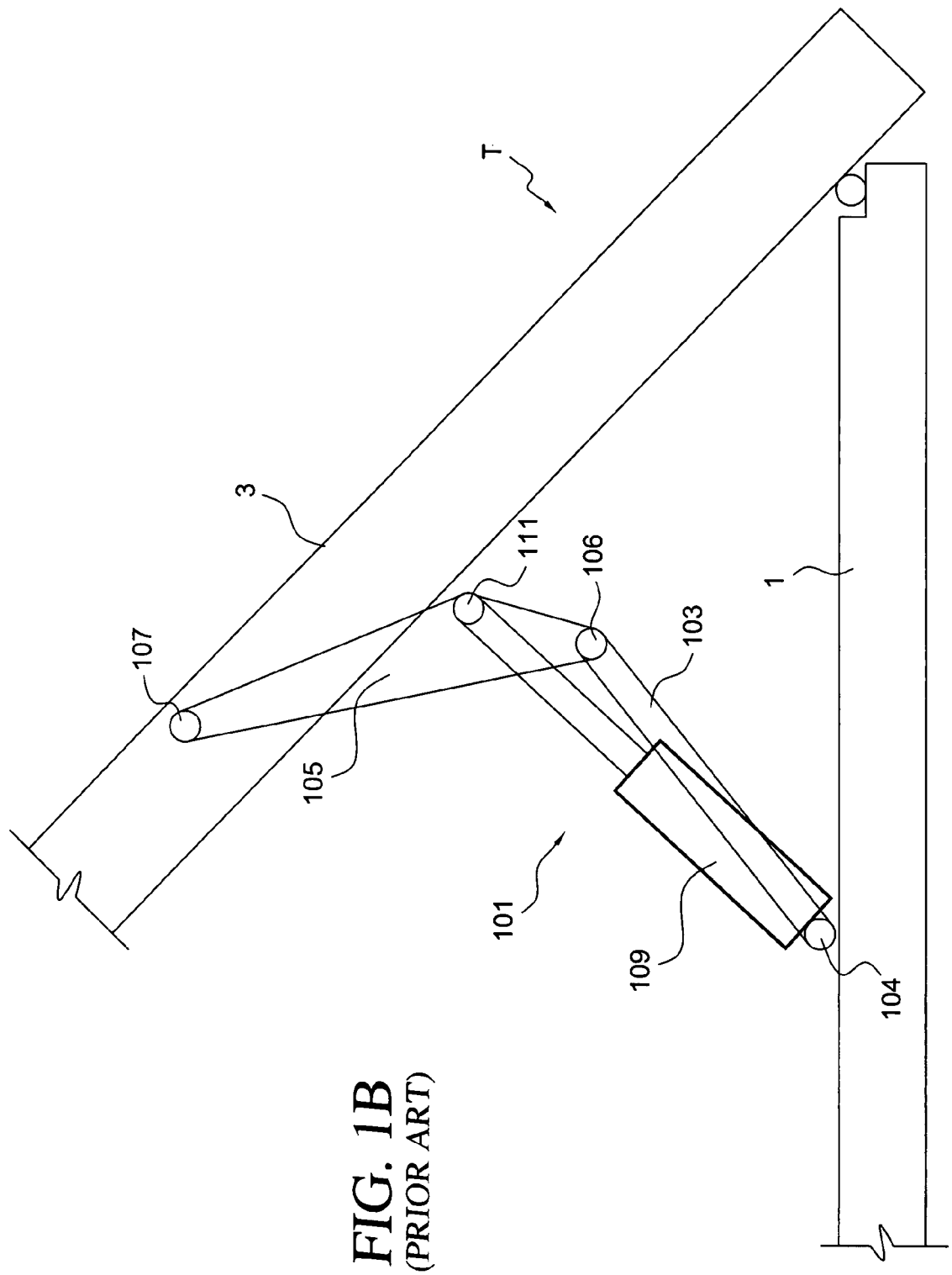

Referring now initially to FIGS. 1A and 1B, therein is illustrated a prior art scissor-type hoist 101 known conventionally as a Type 1, Single Stage Scissor as designated by the National Truck Equipment Association ("NTEA"). Although this type of hoist is very common in the truck equipment industry, several inefficiencies and/or drawbacks have been identified as associated with this hoist design. As such, it is this design which serves as a background in view of which the present invention is compared and described.

As shown in the subject figure, hoist 101 is illustrated installed on a truck T and generally comprises a first lever arm 103 pivotally connected at one end to frame rails 1 of truck T via pivot 104 and at its other end to a second lever arm 105 via pivot 106. Lever arm 105, in turn, is pivotally connected to dump bed frame structures 3 via pivot 107. As can be seen, prior art hoist 101 is a scissor-type hoist which employs a lift cylinder 109 (e.g., a single stage hydraulic cylinder) for raising and lowering the dump bed (not shown) of truck T via dump frame 3. Cylinder 109, in this regard, is connected to truck T via pivot 104 at its base end and is connected to lever arm 105, at its other end, via pivot 111. It should be noted that cylinder 109, in its connection to the hoist and the truck to which it is installed, shares a pivot, pivot 104, with the first lever arm (arm 103) of the hoist. As a result, during initial lift phases (such as depicted in FIG. 1A), much of the force of cylinder 109 is inefficiently used because of the low angle of the cylinder relative to the lift direction of the dump bed. Although the angle of the cylinder relative to the lift direction of the dump bed improves in later stages of dump bed lifting operation (see FIG. 1B), the aforedescribed inefficient design of hoist 101 necessitates the use of larger and more powerful lift cylinders than are otherwise required (at least in the initial lift phase). This, of course, adds expense to the hoist as well as increases the weight of the truck and decreases available free space under the dump bed.

Figure 2:
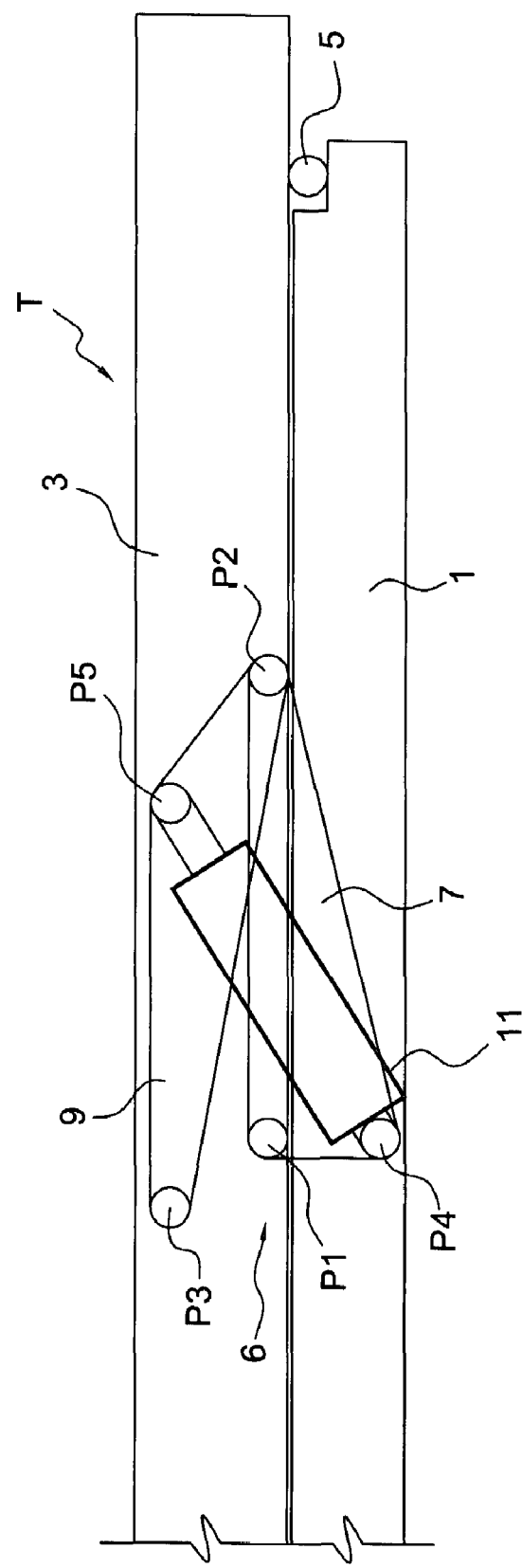
FIG. 2 is a two-dimensional, plan view of one example embodiment of a hoist according to the subject invention shown with the lift cylinder in a non-extended (non-lifted) state (with the example hoist depicted installed between a truck frame and a dump bed).
Figure 3:
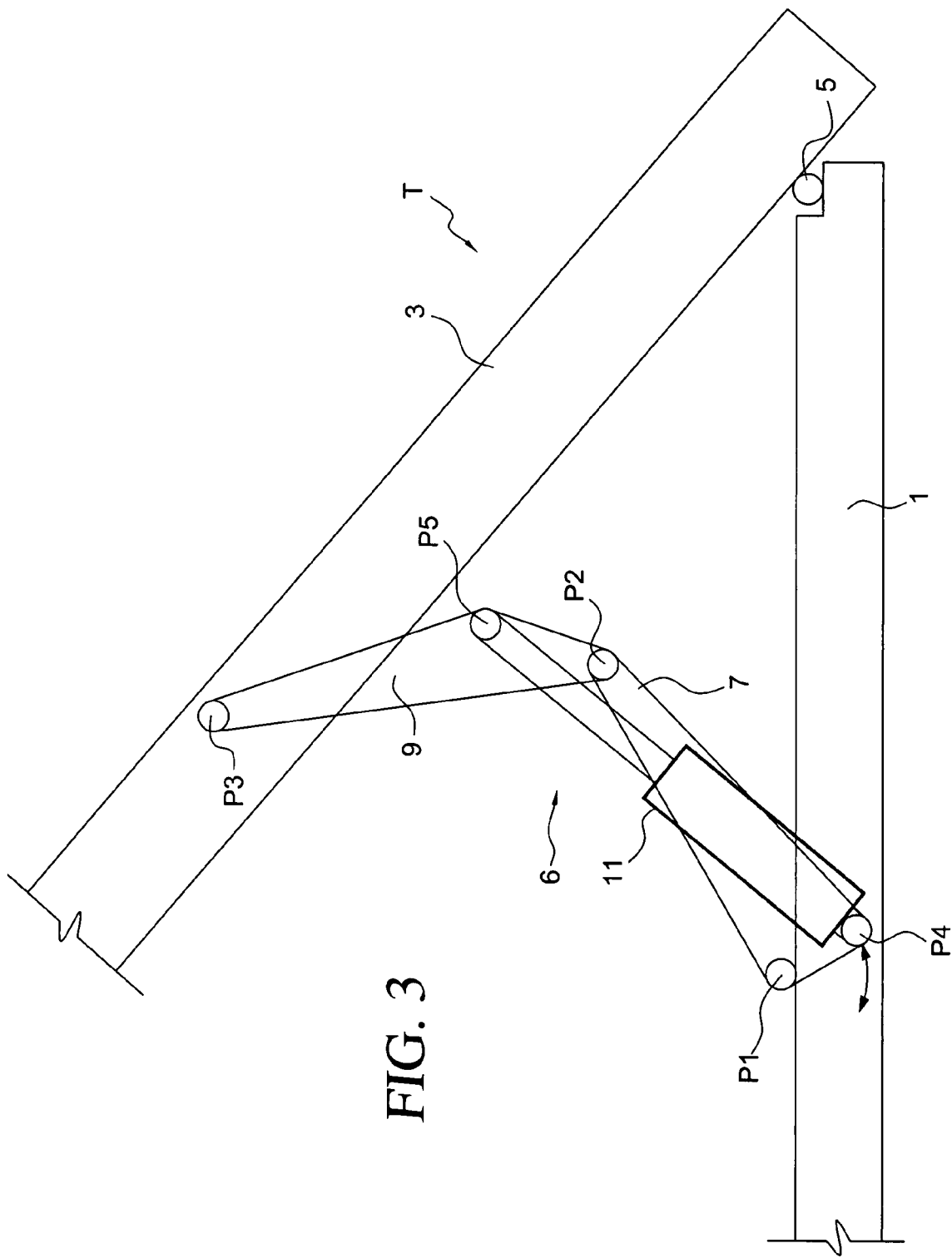
FIG. 3 is an alternative, two-dimensional, plan view of the example hoist depicted in FIG. 2 shown with the lift cylinder in an extended (or lifted) state.
Figure 4:
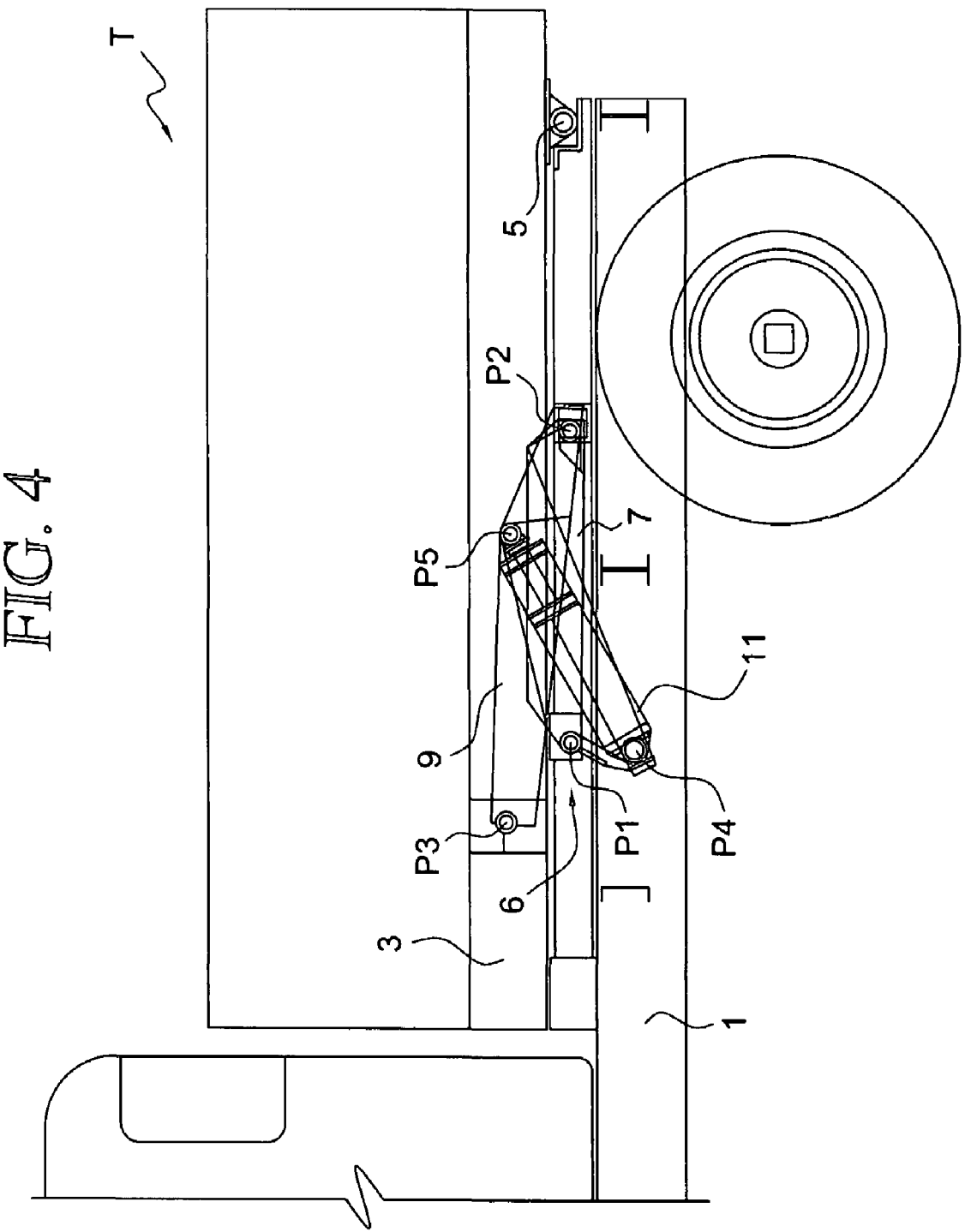
FIG. 4 is a detailed, partial side-view of a truck having a raisable and lowerable dump bed installed with a hoist according to the subject invention (and the dump bed shown in a non-lifted state).
Figure 5:
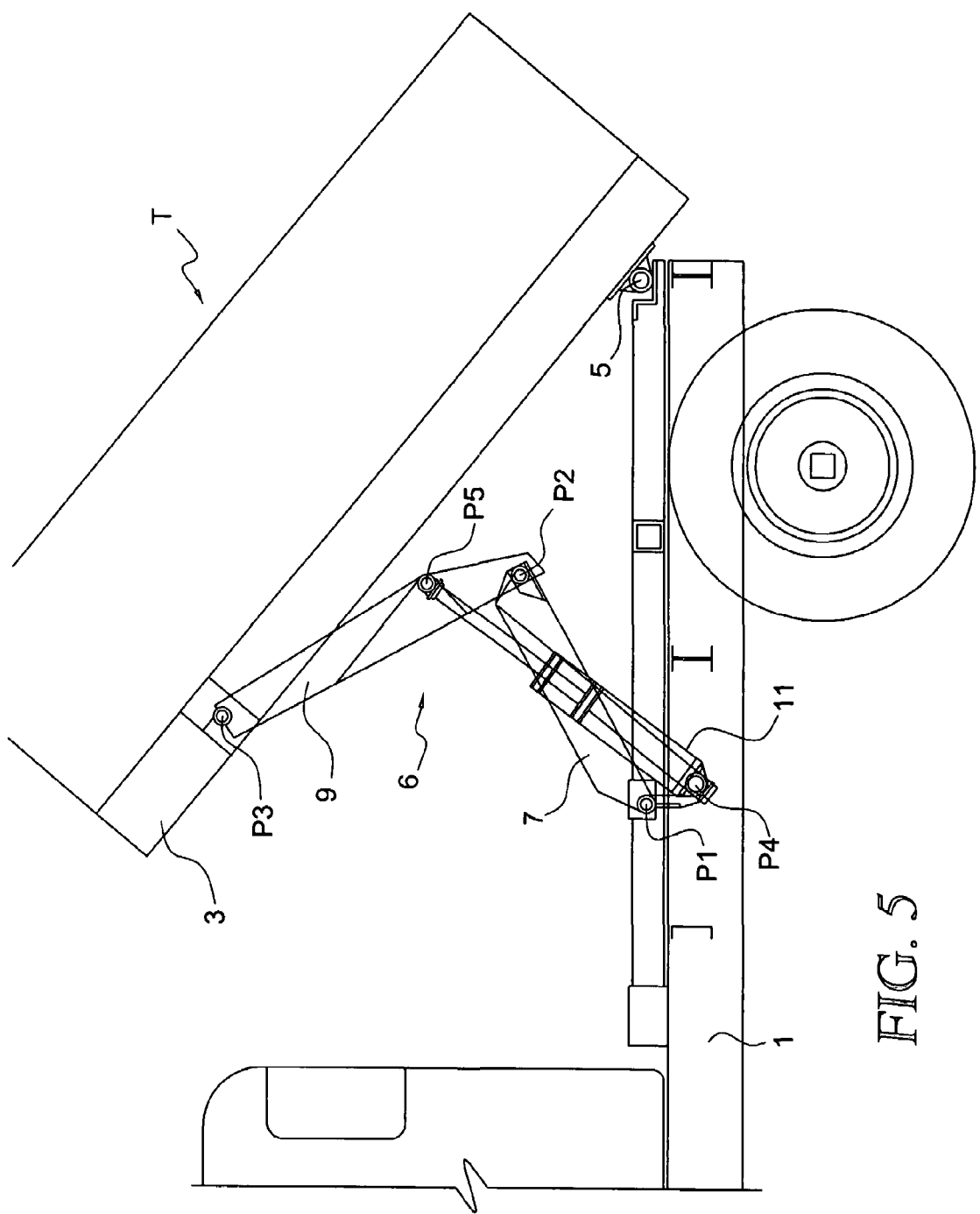
FIG. 5 is a detailed, partial side view of a truck having a raisable and lowerable dump bed installed with a hoist according to the subject invention (and the dump bed shown in a lifted or raised position for effecting a dumping operation).

Turning now to FIG. 2, this figure illustrates a hoist 6 which reduces the above described inefficiencies in hoist design (i.e., described with respect to the hoist depicted in FIGS. 1A and 1B) in conjunction with a partial view of a conventional dump truck T as one environment in which the present invention (e.g., example embodiment, hoist 6) finds utility. Generally speaking, dump truck T's relevant parts as they relate to this embodiment of the invention include a pair of longitudinal truck frame rails 1 on either side of the vehicle (only one side being shown here), frame 3 of a typical dump bed (the actual bed being omitted for clarity), and a rear pivot 5, all conventional in the art. So as to more clearly illustrate novel hoist 6, various other conventional parts of truck T are not shown.

Referring still to FIG. 2, hoist 6 is shown installed on truck T between truck frame rails 1 and frame 3 of a dump bed. Specifically, first lever arm 7 of the hoist is pivotally connected to the truck at its first end via pivot P1 and is connected at its opposite end to second lever arm 9 via pivot P2. The distal end of second lever arm 9, moreover, is connected to dump bed frame 3 via pivot P3 (e.g., a cross-shaft assembly which substantially spans the width of the dump bed frame). Providing lifting power to hoist 6, an extendible and retractable hydraulic cylinder 11 is pivotally connected to first lever arm 7 via pivot P4 and to second lever arm 9 via pivot P5 (located generally between pivots P2 and P3).

Notably, unlike the prior art hoist illustrated in FIGS. 1A and 1B, cylinder 11 of hoist 6 does not share a pivot with its lower scissor arm (lever arm 7) as its connection to truck T. Instead, lever arm 7 of the inventive hoist is a generally triangularly shaped structure (although it need not be) with pivots P1, P2, and P4 located generally at (and thereby "forming") the three corners of the triangle. Rather than connecting cylinder 11 directly to truck frame rails 1 via pivot P1, cylinder 11 is connected to pivot P4 located on triangularly configured lever arm 7. Furthermore, when hoist 6 is in the non-lift phase or position or in the beginning of the lift phase (e.g., when the arms of the hoist are folded down upon one another and therefore generally, but not precisely, parallel to one another) such as illustrated in FIG. 2, pivot P4 is located generally below and approximately in-line with the vertical centerline of pivot P1. Importantly, locating pivot P4 as such (as the point at which cylinder 11 is attached to the lever arm), the angle of thrust of cylinder 11 with respect to the lift direction of the dump bed is improved (i.e., the thrust angle is more nearly parallel to the lift direction). More specifically, rather than the lift cylinder being oriented largely perpendicular to the dump bed lift direction in the non-lift phase (i.e., at or near the beginning of the lift phase) such as prior art hoist 101 depicted in a non-lifted state in FIG. 1A, locating pivot P4 below and generally vertically in-line with pivot P1 angles cylinder 11 away from a perpendicular orientation with respect to the lift direction and more parallel thereto (i.e., more in-line therewith). Angling or re-orienting cylinder 11 as such, lift efficiency is improved and smaller, less powerful (and therefore typically cheaper and/or lighter) lift cylinders can be employed and/or the weight lifting capacity of the hoist is increased.

It should be understood, of course, that even though it is the relative location of pivot P4 beneath and generally vertically in-line with pivot P1 in the beginning of the lift phase that enables the improved efficiencies of the subject hoist invention, it is not intended that the scope of the invention be limited to specific spacing(s) between pivots P1 and P4 or limited to particular degrees of vertical alignment thereof. Instead, it is simply important that, whatever quantity of vertical spacing is chosen and/or whatever degree of vertical alignment is selected, the angle of orientation of cylinder 11 with respect to the lift direction of the dump bed which is obtained provides improved lift efficiency (i.e., as compared to prior art hoists where the lift cylinder and the lower scissor arm share a pivot). It should be further understood that the configurations of one or both of lever arms 7 and 9 can be changed without departing from the scope of the invention as long as the relative (but not necessarily specific) locations of pivots P1-P5 are maintained with respect to one another. This contemplates and includes, for example, an embodiment in which pivot P4 is not located on lever arm 7 at all but, instead, is located lower on the truck frame; lever arm 7, as a result, therefore, not necessarily being triangular in configuration (pivot P4, nevertheless, still being located generally below and generally in-line with pivot P1). This embodiment, however, would not favorably affect the length of cylinder stroke needed as described herein below.

Despite not being specifically limited to particular pivot spacing(s) or lever configurations, certain non-limiting embodiments of hoist 6, such as illustrated in FIGS. 2-5, are capable of improving the lift capacity of the hoist by 20% or more. Furthermore, in embodiments such as illustrated, because pivot P4 moves during operation of the hoist, generally following the direction of the dump bed as it is lifted (see FIG. 3 where the movement of pivot P4 is indicated by directional arrows), the length of stroke of cylinder 11 which is needed to achieve full dump bed lift height is decreased. In the embodiment illustrated, for example, the required stroke length to achieve full lift is reduced by more than 20% without reducing the lift capacity of the hoist.

Hoist 6, of course, can include more than one cylinder and/or sets of lever mechanisms (e.g., pairs of pivotally connected lever arms 7 and 9). Moreover, either single stage or multi-stage telescopic cylinders can be used (although useful with the subject invention, expensive, multi-stage, telescopic cylinders are generally obviated by the hoists described and claimed herein.

Once given the above disclosure, many other features, modifications, and improvements will become apparent to the skilled artisan. Such features, modifications, and improvements are therefore considered to be part of this invention, without limitation imposed by the example embodiments described herein. Moreover, any word, term, phrase, feature, example, embodiment, or part or combination thereof, unless unequivocally set forth as expressly uniquely defined or as otherwise limiting, is not intended to impart a narrowing scope to the invention in contravention of the ordinary meaning of the claim terms by which the scope of the patent property rights shall otherwise be determined:

I claim:

1. A hoist for raising or lowering a truck bed to and from a truck frame which is capable of being located between said bed and said frame, said hoist comprising:
   a first lever arm having a first end connected to a truck chassis via a first pivot and having a second end connected to a first end of a second lever arm via a second pivot, said second lever arm having a second end pivotally connected to a dump bed chassis via a third pivot;
   an extendible and retractable cylinder connected at a first end via a fourth pivot and connected at a second end to said second lever arm via a fifth pivot, said fifth pivot located on said second lever arm between said second pivot and said third pivot;
   wherein in an initial, non-lift position, said first lever arm and said second lever arm are in or near generally parallel orientations with respect to one another and said fourth pivot is located generally below said first pivot a selected offset distance sufficient to improve said cylinder's lift angle relative to a lift direction of said dump chassis;
   wherein in a lifting phase, said cylinder extends and exerts a lifting force on said second lever arm via said fifth pivot causing said second lever arm to exert a lifting force on said dump bed chassis via said third pivot; and wherein said first lever arm and said second lever arm pivot out of the generally parallel orientations towards a dump bed lifted position.

2. A hoist according to claim 1 wherein when said hoist is in said initial, non-lift position, said first lever arm and said second lever arm are folded upon one another in a generally parallel orientation with respect to each other.

3. A hoist according to claim 2 wherein said hoist is so configured such that when in said lifting phase, said cylinder is extending causing said first lever arm and said second lever arm to unfold with respect to each other by pivoting away from one another about said second pivot.

4. A hoist according to claim 3 wherein in said lifting phase, as said cylinder is extending, said fourth pivot rotates partially in an arc about said first pivot.

5. A hoist according to claim 4 wherein when said hoist is in said initial, non-lift position, said fourth pivot is located at a first low position; and when said hoist is in said lifting phase, said fourth pivot moves generally laterally and upwardly relative to said first low position and in a direction generally following a lift direction of a dump bed connected to said dump chassis.

6. A hoist according to claim 5 wherein, during said lifting phase, movement of said fourth pivot in said direction generally following a lift direction of said dump bed maintains said fourth pivot in relative close spatial relation with respect to said first lever arm to which it is attached thereby reducing a length of stroke of said cylinder needed for hoist dump bed lift operations.

7. A hoist according to claim 3 or 5 wherein an angle formed by said first pivot, said second pivot, and said third pivot increases as said cylinder extends and decreases as said cylinder retracts.

8. A hoist according to claim 7 wherein said formed angle, when said hoist is in said initial, non-lift position, is an acute angle.

9. A hoist according to claim 8 wherein said formed angle, when said hoist has completed said lifting phase, is an obtuse angle.

10. A hoist according to claim 7 wherein locating said fourth pivot generally below said first pivot at said selected offset distance below said first pivot improves said cylinder lift capacity by at least 10%.

11. A hoist according to claim 7 wherein locating said fourth pivot generally below said first pivot at said selected offset distance below said first pivot improves said cylinder lift capacity by at least 20%.

12. A hoist according to claim 3 or 5 in combination with and installed on a truck having longitudinal frame rails and a truck dump bed, said hoist installed generally between said frame rails and said truck dump bed.

13. A hoist according to claim 1 wherein said fourth pivot is connected to a structure selected from the group consisting of: said truck chassis and said first lever arm.

14. A hoist according to claim 1 wherein said first lever arm comprises a generally triangular configuration of pivots including said first pivot, said second pivot, and said fourth pivot.

15. A hoist according to claim 13 or 14 wherein, in said initial, non-lift position, said fourth pivot is initially located generally or directly in-line with a vertical centerline of said first pivot.

* * * * *